US011861965B2

(12) United States Patent
Eun

(10) Patent No.: US 11,861,965 B2
(45) Date of Patent: Jan. 2, 2024

(54) COIN COUNTING APPARATUS INCLUDING BAD COIN SORTING UNIT

(71) Applicants: Nam Pyo Eun, Gwangju (KR); SAITEC INC., Naju-si (KR)

(72) Inventor: Nam Pyo Eun, Gwangju (KR)

(73) Assignee: Saitec Inc., Naju-si (KR)

( * ) Notice: Subject to any disclaimer, the term of this patent is extended or adjusted under 35 U.S.C. 154(b) by 644 days.

(21) Appl. No.: 16/979,544

(22) PCT Filed: Apr. 13, 2020

(86) PCT No.: PCT/KR2020/004977
§ 371 (c)(1),
(2) Date: Sep. 10, 2020

(87) PCT Pub. No.: WO2020/209695
PCT Pub. Date: Oct. 15, 2020

(65) Prior Publication Data
US 2023/0096547 A1 Mar. 30, 2023

(30) Foreign Application Priority Data
Apr. 12, 2019 (KR) ........................ 10-2019-0042866

(51) Int. Cl.
*G07D 3/16* (2006.01)
*G07D 3/02* (2006.01)
*G07D 5/08* (2006.01)

(52) U.S. Cl.
CPC ................. *G07D 3/16* (2013.01); *G07D 3/02* (2013.01); *G07D 5/08* (2013.01); *G07D 2201/00* (2013.01); *G07D 2205/00* (2013.01)

(58) Field of Classification Search
CPC .. G07D 3/16; G07D 3/02; G07D 5/08; G07D 2201/00; G07D 2205/00; G07D 5/02
See application file for complete search history.

(56) References Cited

U.S. PATENT DOCUMENTS 6,349,811 B1 * 2/2002 Chung ...................... G07F 1/04 194/346
6,896,114 B1 * 5/2005 Matsumoto ............... G07F 5/24 194/215

(Continued)

FOREIGN PATENT DOCUMENTS

CN 106600804 A * 4/2017 ............. G07D 3/128
GB 2335775 A * 9/1999 ............... G07D 1/02

(Continued)

OTHER PUBLICATIONS

International Search Report and Written Opinion in related International Patent Application No. PCT/KR2020/004977.

*Primary Examiner* — Jeffrey A Shapiro
(74) *Attorney, Agent, or Firm* — Eric L. Lane; Green Patent Law

(57) ABSTRACT

The present invention includes a coin sorting part in which a plurality of coin sorting holes are formed in a circumferential direction and a coin separation plate on which a coin guide portion for guiding the coins to the coin sorting part is formed, a bad coin discharge unit installed in the coin guide portion of the coin separation unit and configured to detect whether the coin moving to be sorted is a bad coin and sort the bad coin, a coin supply unit configured to supply the coins to be sorted and moved along the coin guide portion, and a coin transfer unit elastically pressed against the coin separation unit and configured to move the coin input from the coin supply unit to the coin guide portion and the coin sorting holes in a state in which the coins are pressed against the coin separation plate.

6 Claims, 9 Drawing Sheets

(56) References Cited

U.S. PATENT DOCUMENTS

| | | | | |
|---|---|---|---|---|
| 10,896,566 B2 * | 1/2021 | Umeda | G07D 3/14 | |
| 11,232,667 B2 * | 1/2022 | Roodenburg | G07D 1/00 | |
| 2005/0124280 A1 * | 6/2005 | Itako | G07D 1/00 | 453/18 |
| 2011/0189932 A1 * | 8/2011 | Adams | G07D 3/06 | 453/3 |
| 2014/0187134 A1 * | 7/2014 | Stieber | G07D 3/14 | 453/4 |
| 2015/0011145 A1 * | 1/2015 | Suetomi | G07D 9/00 | 453/4 |

FOREIGN PATENT DOCUMENTS

| | | | |
|---|---|---|---|
| JP | 2013-145488 | A | 7/2013 |
| JP | 2014-052716 | A | 3/2014 |
| KR | 10-0780052 | B1 | 11/2007 |
| KR | 2008-0102520 | A | 11/2008 |
| KR | 10-2016-0013704 | A | 2/2016 |

* cited by examiner

COIN COUNTING APPARATUS INCLUDING BAD COIN SORTING UNIT

TECHNICAL FIELD

The present invention relates to a coin counting apparatus, and more specifically, to a coin counting apparatus capable of separating coins according to sizes to count the coins so as to give change, and sorting and discharging bad coins.

BACKGROUND ART

In general, contactless cards, coupons, banknotes, coins, and the like are used as payment methods for public transportation systems. When using coins among the payment methods, since various kinds of coins are used, there is a great deal of difficulty in counting coins. Particularly, in a case in which the coins are paid as a transportation expense, since it is difficult to determine whether the paid transportation expense is correct and a driver may not focus on driving when checking the paid transportation expense, there is a problem in that a risk of safety accident is increased.

A coin sorting apparatus is disclosed in Korean Patent Laid-Open Publication No. 2008-0102511. The coin sorting apparatus includes a sorting housing in which an accommodation part in a circular shape is formed and coin grooves are formed in a bottom surface thereof for each size of coin along an inner wall of the accommodation part, and a segregating rotating plate rotatably mounted on the accommodation part and configured to transfer coins introduced into the accommodation part along the inner wall of the accommodation part to discharge the coins through the coin grooves.

In addition, a coin counting apparatus is disclosed in Korean Patent Laid-Open Publication No. 2007-0106208. The disclosed coin counting apparatus includes a rotating plate configured to discharge coins using centrifugal force, a high speed transfer roller configured to discharge the coins again to transfer the discharged coins at a high speed using rotational power, and a transfer channel configured to guide the discharged coins toward a counter sensing unit which is known, wherein a curved part is provided at a front end of the transfer channel, and a shock absorber is provided on the curved part to absorb a shock of the coins and transfer the coins along one sidewall of the transfer channel when the coins discharged from the high speed transfer roller are introduced into the curved part.

A high-speed coin counting apparatus is disclosed in Korean Patent Registration No. 0663636, and a counting apparatus using a coin and a method of controlling the same is disclosed in Korean Patent Registration No. 09109630.

Since the conventional coin counting apparatuses having the above-described structures tend not to detect coins according to materials of the coins passing through coin transfer channels while sorting the coins, reliability of detection and coin counting cannot be improved. In addition, it is difficult to count the input coins and give change.

A coin counting and sorting apparatus is disclosed in Japanese Patent Application No. 2001-060277, and a collecting apparatus of a coin depositing and dispensing apparatus for a coin counting apparatus is disclosed in Korean Patent Publication No. 2008-0102520.

The above-described conventional coin counting apparatuses have problems in that jams occurring when coins are sorted and counted may not be suppressed and bad coins may not be discharged. In the case in which the bad coins may not be discharged, change may not be smoothly given.

DISCLOSURE

Technical Problem

The present invention is directed to providing a coin counting apparatus including a bad coin sorting unit capable of fundamentally preventing trouble from occurring due to a bad coin because the bad coin may be discharged before coins are sorted.

The present invention is also directed to providing a coin counting apparatus including a bad coin sorting unit capable of reducing a discharge error occurring due to stacking of coins supplied to a sorting portion and a discharge delay time for sorting the coins and giving change with the sorted coins.

The present invention is also directed to providing a coin counting apparatus including a bad coin sorting unit capable of improving reliability of sorting bad coins and minimizing a delay time when the bad coins are discharged to improve efficiency of sorting coins.

Technical Solution

One aspect of the present invention provides a coin counting apparatus allowing a bad coin to be sorted which includes a coin separation unit installed on a support frame and including a coin sorting part in which a plurality of coin sorting holes for sorting coins according to sizes of the coins are formed in a circumferential direction and a coin separation plate on which a coin guide portion for guiding the coins to the coin sorting part is formed, a bad coin discharge unit installed in the coin guide portion of the coin separation unit and configured to detect whether the coin moving to be sorted is a bad coin and sort the bad coin, a coin supply unit configured to supply the coins to be sorted and moved along the coin guide portion, and a coin transfer unit elastically pressed against the coin separation unit and configured to move the coin input from the coin supply unit to the coin guide portion and the coin sorting holes in a state in which the coins are pressed against the coin separation plate.

The bad coin discharge unit may include bad coin detection sensors installed on the coin guide portion, and a discharge portion configured to discharge a bad coin detected by the bad coin detection sensors from the coin guide portion before the bad coin is introduced into the coin sorting part. In the discharge portion, a bad coin outlet may be formed in a coin guide portion disposed between the bad coin detection sensors and the coin sorting part. In addition, the discharge portion may include a discharge door forming a part of the coin guide portion and installed so that the bad coin outlet is opened to discharge the bad coin when the bad coin moves, and a door open-close drive part installed on the support frame or a lower surface of the coin guide portion to open or close the discharge door.

The coin counting apparatus may include coin collection containers installed on the support frame under the coin sorting holes to stack the coins passing through the coin sorting holes, and a coin stack and change discharge unit configured to count the coins stacked in the coin collection container and discharge change.

The coin counting apparatus may further include a guide member which is coupled to an upper surface of the coin separation plate installed on the support frame to move the coin along the coin sorting holes disposed in a circumferential direction in a state in which the guide member is in contact with one side surface of the coin, and in which a guide surface matches with an inner edge of the coin sorting hole to form a coin transfer path.

The coin supply unit may include a coin input hopper member connected to an inlet of the coin guide portion formed due to the guide member and forming a coin outlet, a rotation disc installed in an interior defined by the coin input hopper member to discharge the coin input to the coin input hopper member toward the coin outlet, and a rotation disc drive motor supported by a lower surface of the coin separation plate to rotate the rotation disc.

The coin transfer unit may include a ring gear guided by an inner circumferential surface of the support frame to be rotatably installed on the coin separation plate installed on the support frame and including a hollow portion to expose a rotation disc of the coin supply unit, a drive motor installed on the support frame, a drive gear installed on a rotation shaft of the drive motor and engaged with the ring gear, and an elastic pressing member installed on the ring gear and configured to move the coin supplied from the coin supply unit in a state in which the coin is pressed against an upper surface of the coin separation plate.

Meanwhile, in the coin stack and change discharge unit installed on an upper surface of the support frame, coin collection containers having cylindrical shapes may be installed under the coin sorting holes of the coin separation plate, a slider, which is slid on a guide rail to open or close a lower surface of each of the coin collection containers and to discharge one coin when moving forward and rearward, may be formed on a lower surface of the support frame on which the coin collection containers are installed, and a forward-rearward movement drive part configured to move the slider forward and rearward may be installed on the support frame.

Advantageous Effects

Since a coin counting apparatus including a bad coin sorting unit according to the present invention can separate and sort coins according to sizes thereof while individually moving the coins, stack the coins, and give change with the stacked coins, a commodity value of the coin counting apparatus can be improved.

In addition, since the coin counting apparatus sorts bad coins from coins input at random and discharges the bad coins to the outside, trouble due to the bad coins can be reduced, and particularly, a coin discharge trouble of overlapping of coins discharged to a coin outlet by a coin supply unit can by fundamentally reduced.

MODES OF THE INVENTION

Figure 1:
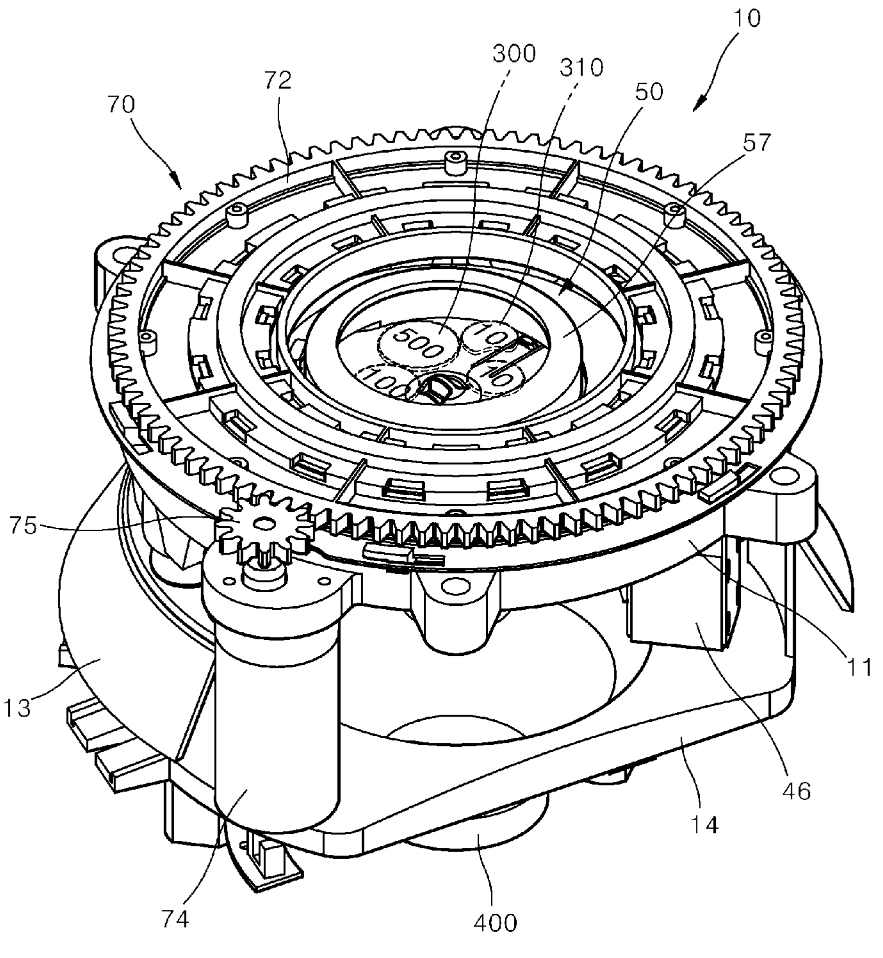
FIG. 1 is a perspective view illustrating a coin counting apparatus including a bad coin sorting unit according to the present invention.

A coin counting apparatus including a bad coin sorting unit according to the present invention may separate input coins, count the separated coins, and give change, and one embodiment thereof is illustrated in FIGS. 1 to 8.

Referring to the accompanying drawings, a coin counting apparatus 10 including a bad coin sorting unit according to the present invention includes a coin sorting part 25 which is installed on a support frame 11 and in which a plurality of coin sorting holes 21 for sorting coins according to sizes of coins 300 are formed in a circumferential direction, a coin separation unit 20 including a coin separation plate 28 in which a coin guide portion 26 for guiding the coins to the coin sorting part 25 is formed, and a bad coin discharge unit 30 installed in the coin guide portion 26 of the coin separation unit 20 and configured to sort bad coins 310 by detecting whether the coins moving to be sorted are bad coins. In addition, the coin counting apparatus 10 includes a coin supply unit 50 installed at a central portion of the coin separation plate 28 and configured to supply the coins to be moved along the coin guide portion 26.

In addition, the coin counting apparatus 10 including the bad coin sorting units includes a coin transfer unit 70 elastically pressed against the coin separation plate 28 and configured to move the coin 300 input through the coin supply unit 50 to the coin guide portion 26 and the coin sorting holes 21 in a state in which the coin 300 is pressed against the coin separation plate 28, and a coin stack and change discharge unit 100 installed on a lower surface, which corresponds to the coin sorting holes 21, of the coin sorting part 25 of the coin separation plate 28 in the support frame 11 and configured to stack the sorted coins 300 in coin collection containers 101, count the coins 300, and give change with the coins 300.

Components of the coin counting apparatus including the bad coin sorting unit according to the present invention formed as described above will be described below in detail.

The coin separation unit 20 includes the coin separation plate 28 in which the plurality of coin sorting holes 21 for sorting the coins 300 according to sizes of the coins 300 are formed to be disposed in the circumferential direction. The coin guide portion 26 is formed on the coin separation plate 28 configured to guide the coins 300 to move along the coin sorting holes 21 disposed in the circumferential direction.

The coin separation plate 28 is fixed to an upper portion of the support frame 11 but is not limited thereto and may also be integrally formed with the support frame 11. In addition, a rotation disc installation portion 22 in which a rotation disc 51, which will be described below, of the coin supply unit 50 is positioned is formed in the central portion of the coin separation plate 28.

The coin sorting holes 21 formed in the coin separation plate 28 are installed to be disposed in the circumferential direction, and sizes of the coin sorting holes 21 increase in a counter-clockwise direction so that a coin having a smaller diameter is discharged first. The number of the coin sorting holes 21 corresponds to the number of coins (the number of values) used in a nation where the coin counting apparatus will be installed.

In addition, a guide member 29 for guiding the coins passing through the coin sorting holes 21 is installed in a lower surface of the coin separation plate 28, holes 29*a* having the same size as and corresponding to the coin sorting holes 21 are formed in the guide member 29, and guide ribs 29*b* extending downward to guide the coins to a coin collection container, which will be described below, are formed at edges of the holes 29*a*.

In addition, a guide member 27, which comes into contact with one side of an outer circumferential surface of the coin 300 moving along the coin guide portion 26 so that an edge of the coin sorting hole 21 matches with the edge of the coin 300, is formed inside the coin guide portion 26 of the coin separation plate 28. The coin 300 moving along the coin guide portion 26 moves to the coin sorting part 25 in a state in which the outer circumferential surface is pressed against the guide member 27.

Meanwhile, a part of an inner side surface the guide member 27 has a trace matching with an edge of a rotation plate installation portion 22, and another part thereof opens outward to form a discharge guide portion 27*a* for guiding the coin 300 to the coin guide portion 26.

The coin supply unit 50 includes the rotation disc 51 formed on the rotation disc installation portion 22 and configured to push the coin outward using a centrifugal force. In addition, a rotation disc drive motor 55 for rotating the rotation disc 51 is installed on the lower surface of the coin separation plate 28 or the support frame 11, and a drive shaft thereof passes through the rotation disc installation portion 22 and is coupled to the rotation disc 51. In addition, a coin input hopper member 57 which surrounds the rotation disc 51 and in which a coin inlet 56 through which the coins are input is formed at an upper portion side thereof is installed on the support frame 11 or the coin separation plate 28. A lower surface of the coin input hopper member 57 is supported by the guide member 27 so that a coin outlet 26*a* is defined by the guide member 27 and the coin input hopper member 57.

The rotation disc 51 may be rotated by the rotation disc drive motor 55 to discharge the coin through the coin outlet 26*a*, and one or more elastic pieces 52 cut from an edge of the rotation disc 51 toward a central portion of the rotation disc 51 to have a predetermined width and be integrally formed with the rotation disc 51 are formed on the rotation disc 51. The elastic piece 52 is cut in a radial direction from the central portion so that the elastic piece 52 is elastically and vertically deformed. In addition, at least one protrusion 53 for pushing the coin outward is formed on an upper surface of an end portion of each of the elastic pieces 52.

A guide protrusion (not shown) for pushing the input coin 300 outward using a centrifugal force may be formed on an upper surface of the rotation disc 51. Here, the upper surface of the edge of the rotation disc 51 may be maintained to have a height which is equal to a height of an upper surface of the coin separation plate 28.

As illustrated in FIGS. 2 and 4 to 7, the bad coin discharge unit 30 is installed between the coin outlet 26*a* and the coin sorting part 25 and includes a bad coin detection part 33 including first and second bad coin detection sensors 31 and 32 disposed in the coin guide portion 26 and a discharge portion 40 through which a bad coin detected by at least two first and second bad coin detection sensors 31 and 32 of the bad coin detection part 33 is discharged from the coin guide portion 26 before being introduced into the coin sorting part 25. The bad coin detection part 33 including the first and second bad coin detection sensors 31 and 32 includes a coin guide plate member 35 coupled to a coupling hole 34 formed in the coin guide portion 26 of the coin separation plate 28 to form a part of the coin guide portion 26, and the first and second bad coin detection sensors 31 and 32 are installed under the coin guide plate member 35. In addition, a circuit substrate 36 for driving the first and second bad coin detection sensors 31 and 32 is installed on a lower surface of the coin guide plate member 35. The bad coin detection part 33 may be formed to have a structure configured to detect a change in frequency band using a resistor-inductor-capacitor (RLC) resonance circuit.

The bad coin detection part 33 may be formed to include an alternating current (AC) power source, an RLC resonance circuit part including a resistor, a capacitor, and an inductor, and a waveform detection part which detects a waveform of an output frequency of the resonance circuit part. The RLC resonance circuit part may include a first line of which one end is in contact with the AC power source and the other end thereof is open, a first contact terminal formed at the open end of the first line to come into contact with the coin, a second line of which one end is connected to a capacitor and an inductor in series and the other end thereof is open, and a second bad coin detection sensor formed on the open end of the second line to come into contact with the coin and formed to be separated from the first bad coin detection sensor, and the first contact terminal and a second contact terminal are disposed on a path through which the coin passes.

The bad coin detection part 33 according to the present embodiment may distinguish a normal coin from a bad coin through a principle in which, when the normal coin (having a resistance value within a specific range) comes into contact with and passes both of the first bad coin detection sensor 31 and the second bad coin detection sensor 32, a predetermined frequency waveform corresponding to the resistance value within the specific range is generated in a detection part, and when the bad coin (having a resistance value outside the specific range) comes into contact with and passes both of the first bad coin detection sensor 31 and the second bad coin detection sensor 32, a waveform which is clearly different from the predetermined frequency waveform is generated in the detection part.

In addition, the discharge portion 40 of the bad coin discharge unit 30 includes a discharge door 42 rotatably installed in the coin guide plate member 35 on which the first and second bad coin detection sensors 31 and 32 are installed. The discharge door 42 forms a bad coin outlet 41 in the coin guide portion 26. The discharge door 42 forms a part of the coin guide portion 26, opens the bad coin outlet 41 to discharge the bad coin when the bad coin moves, and closes the bad coin outlet 41 to move the coin 300 to the coin sorting part 25 when the first and second bad coin detection sensors 31 and 32 detect the moving normal coin.

The discharge door 42 is opened and closed by a door open-close drive part 45, and the door open-close drive part 45 is driven by a link 47 operated by a solenoid 46. The link 47 operated by the solenoid 46 is rotatably installed around a support pin 49 installed on a bracket 48 for fixing the solenoid 46. A moving pin 47*a* is installed on an end portion of the link 47, and the moving pin 47*a* is slidably supported by a long hole 42*a* installed in a lower surface of the discharge door 42. In addition, the other side of the link 47 extends from the support pin 49 at a predetermined angle to be coupled to a shaft of the solenoid 46.

However, the operation of the discharge door 42 is not limited to the above-described embodiment and may be performed by an actuator having relatively high responsiveness.

Figure 4:
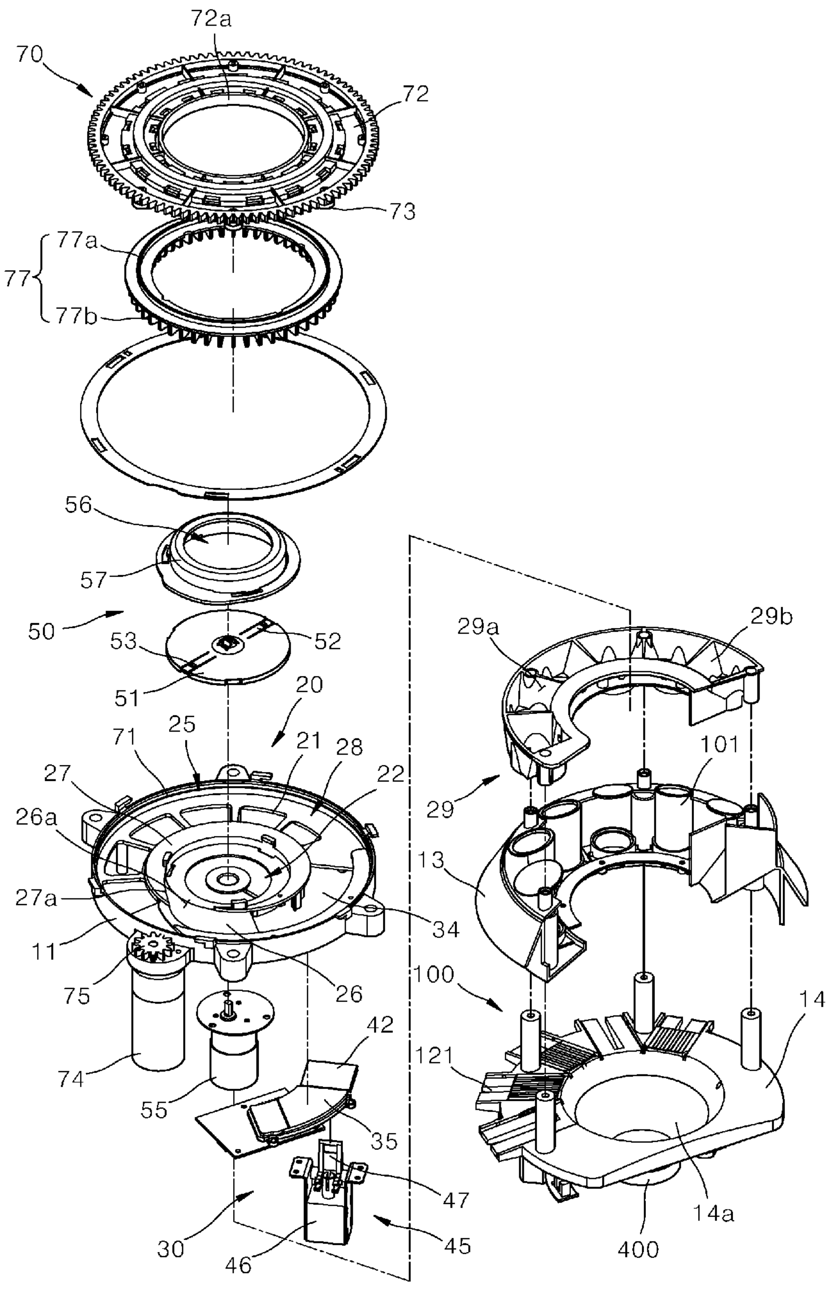
FIG. 4 is an exploded perspective view illustrating the coin counting apparatus including the bad coin sorting unit illustrated in FIG. 1.
Figure 5:
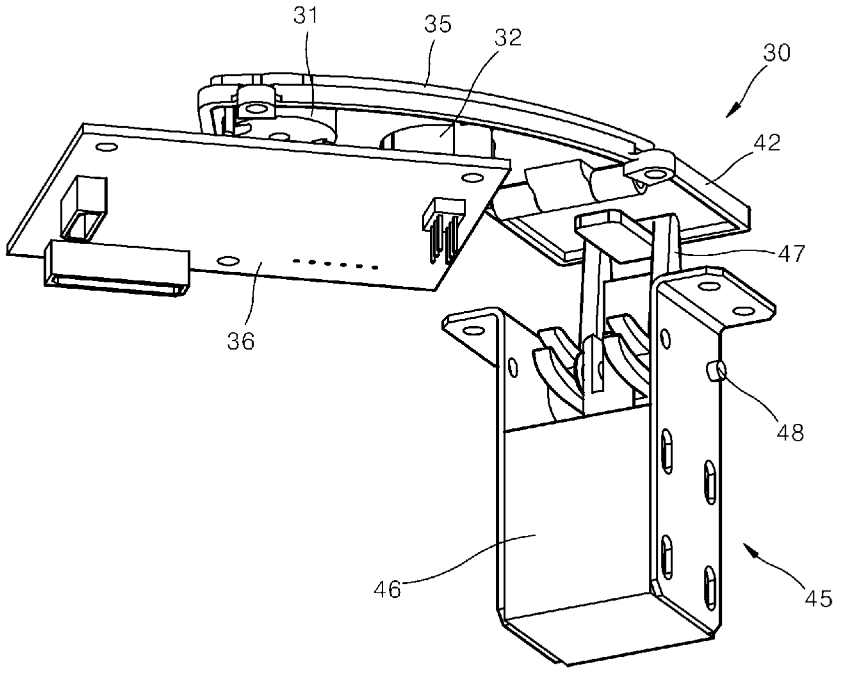
FIG. 5 is a perspective view illustrating a bad coin discharge unit of the coin counting apparatus including the bad coin sorting unit according to the present invention.
Figure 6:
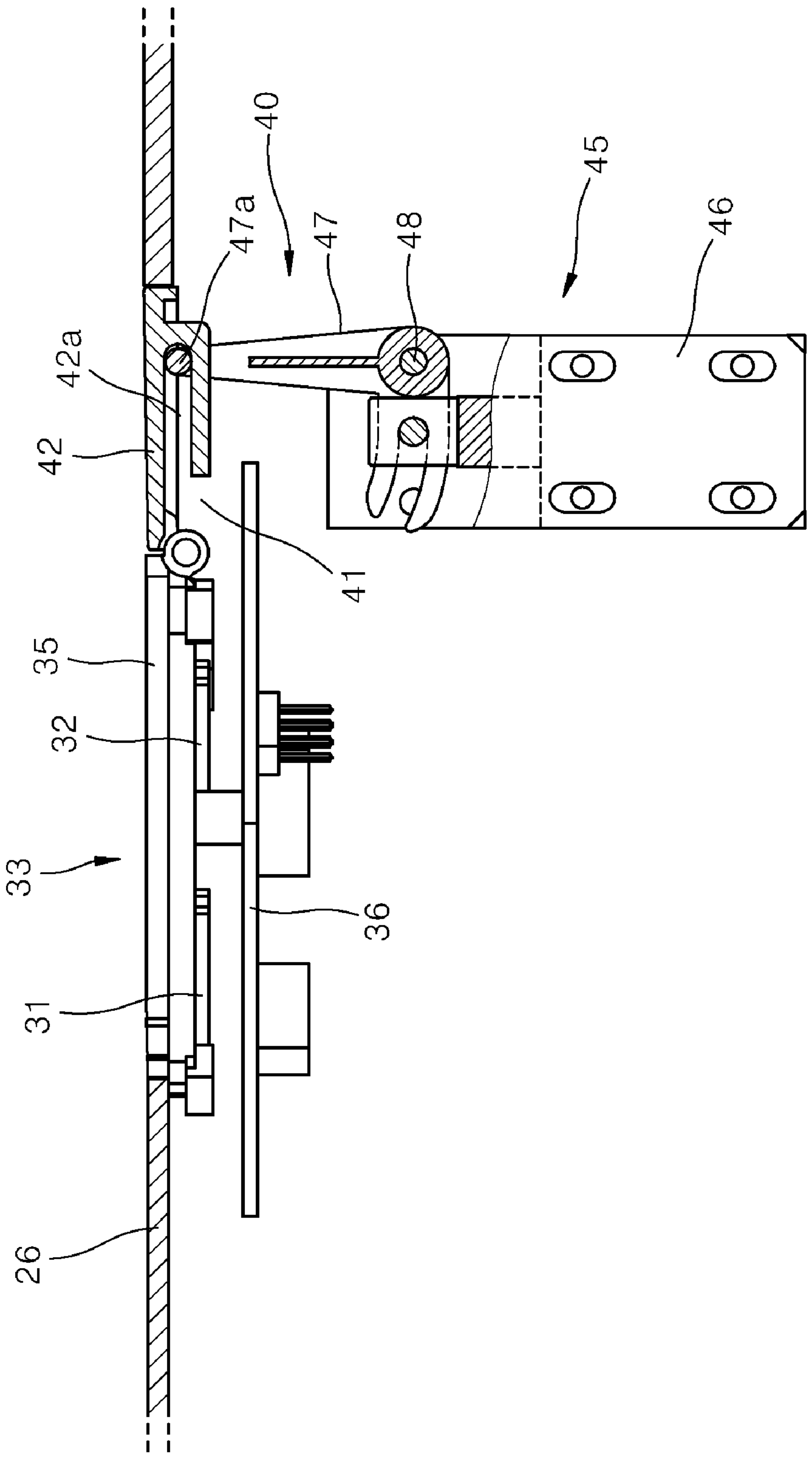
FIGS. 6 to 7 are side cross-sectional views illustrating the bad coin discharge unit illustrated in FIG. 5.
Figure 8:
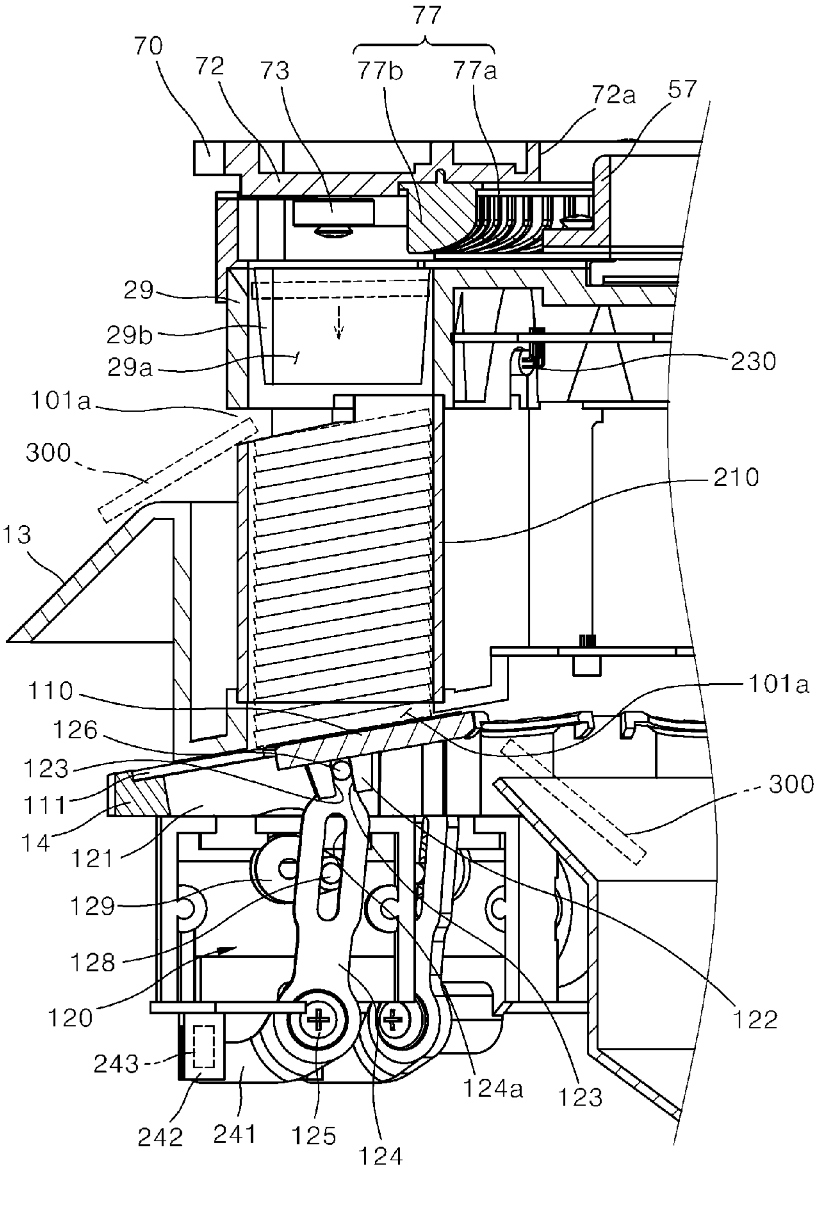
FIG. 8 is a cross-sectional view illustrating a coin stack and change discharge unit of the coin counting apparatus including the bad coin sorting unit illustrated in FIG. 1.

As illustrated in FIGS. 1, 4, and 8, the coin transfer unit 70 includes a ring gear 72 which is guided by an inner circumferential surface of a guide ring 71 forming the support frame 11 and rotatably installed on the coin separation plate 28 supported by the support frame 11. A hollow portion 72*a* is formed in the ring gear 72 to expose the coin input hopper member 57 of the coin supply unit 50. The ring gear 72 may support the guide ring 71 using a plurality of guide rollers 73 formed on an edge of a lower surface of the ring gear 72 and pressed against and guided by the inner circumferential surface of the guide ring 71. A drive motor 74 is formed on the support frame 11 and the coin separation plate 28, and a drive gear 75 engaged with the ring gear 72 is installed on a drive shaft of the drive motor 74.

In addition, an elastic pressing member 77, which moves the coin supplied from the coin supply unit 50 in a state in which the coin is pressed against the upper surface of the coin separation plate 28, is provided on a lower surface of the ring gear 72. The elastic pressing member 77 includes an elastic main body portion 77*a* having a ring shape and a width corresponding to the coin guide portion 26 and a plurality of pressing pieces 77*b* protruding downward from and along a lower surface of the elastic main body portion 77*a*. The pressing pieces 77*b* are formed of a flexible material and have a constant thickness and a width which is equal to the width of the elastic main body portion 77*a*. The elastic pressing member 77 may further include a pressing piece support member (not shown) coupled to the elastic main body portion 77*a* to support the pressing piece 77*b*.

Meanwhile, the coin stack and change discharge unit 100 has a structure configured to stack the coins 300 sorted by the coin separation unit 20 in the coin collection containers 101 and give change by discharging the stacked coins in the coin collection containers 101.

As illustrated in FIGS. 1 to 3, and 8, the coin stack and change discharge unit 100 includes the guide member 29 installed on the lower surface of the coin separation plate 28. The holes 29*a* are formed in the guide member 29 to correspond to the coin sorting holes 21, and the guide ribs 29*b* for guiding the coins 300 are formed at the edges of the holes.

The coin collection containers 101 having cylindrical shapes are installed on a lower surface of the guide member 29. A coin discharge portion 101*a* for discharging the coins, which are introduced thereinto in a state in which the coins 300 are stacked in and fill the coin collection container 101, to the outside is formed in an upper surface of each of the coin collection containers 101. The coin discharge portion 101*a* is formed to correspond to a coin discharge guide 13 on a frame 12.

Figure 2:
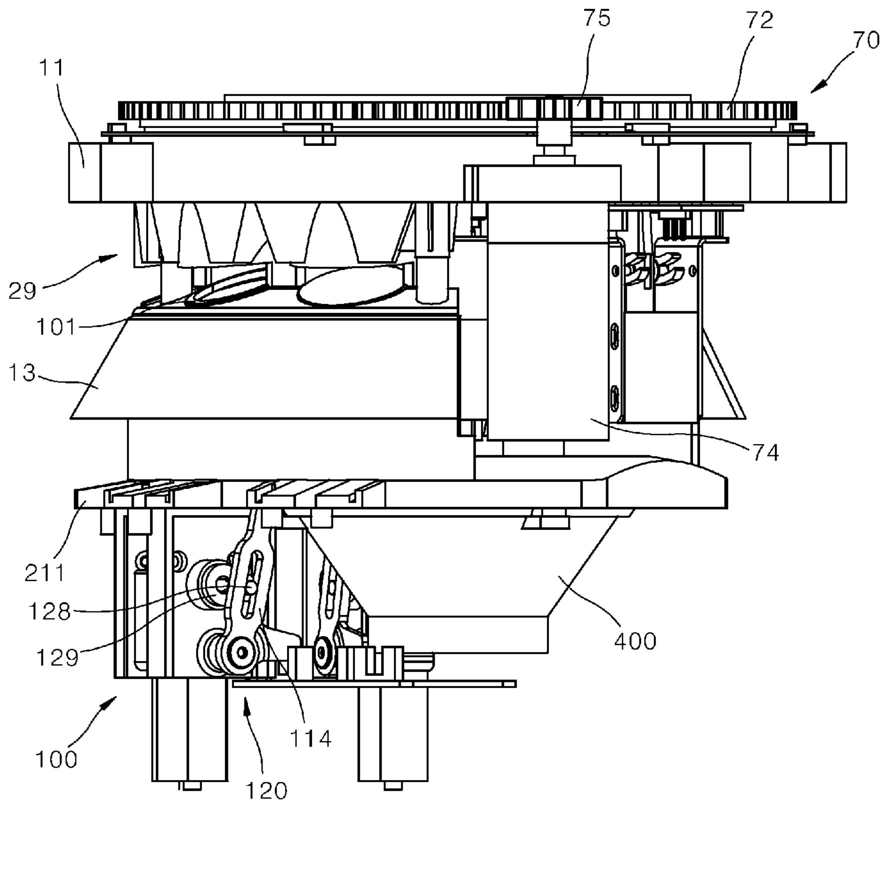
FIG. 2 is a partially-cut side view illustrating a part of the coin counting apparatus including the bad coin sorting unit according to the present invention illustrated in FIG. 1.
Figure 3:
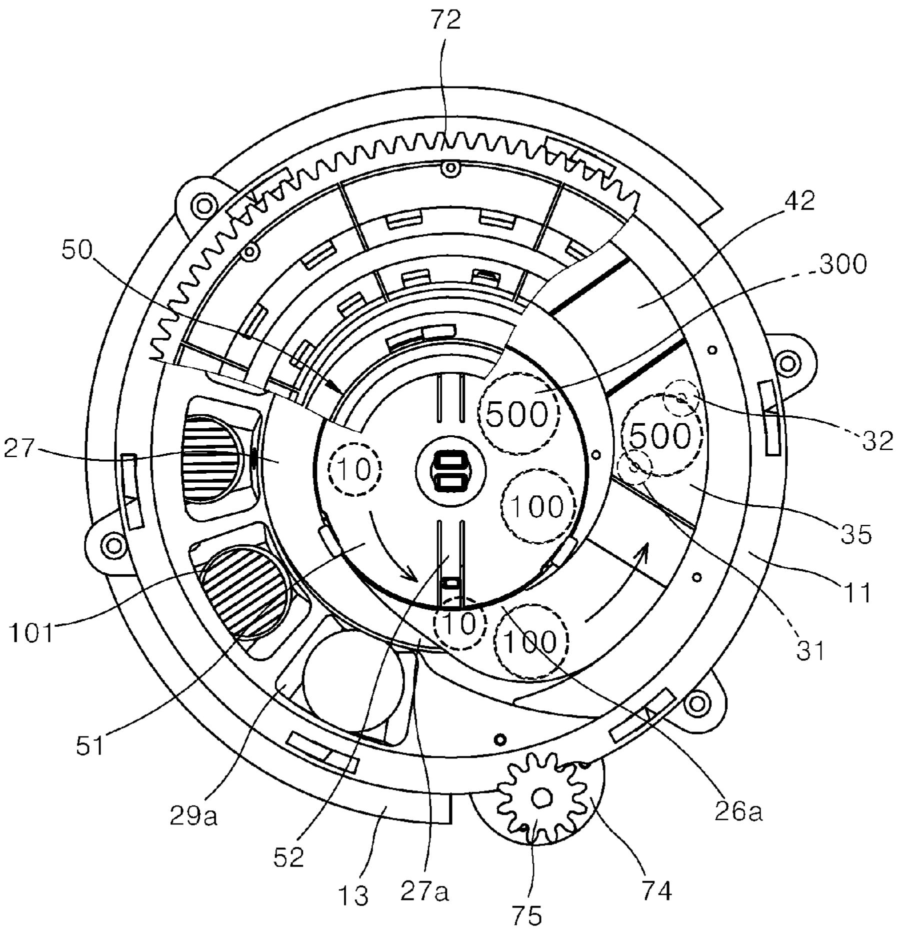
FIG. 3 is a partially-cut plan view illustrating a part of the coin counting apparatus illustrated in FIG. 1.

As illustrated in FIGS. 2, 3, and 8, sliders 110 for opening and closing lower surfaces of the coin collection containers 101 and discharging one coin while moving forward and rearward are installed on a lower surface of the frame 12 on which the coin collection containers 101 are installed. The slider 110 is moved forward toward and rearward from a center of the hollow portion of the support frame 11 in the radial direction by a guide rail 111 installed on a slider support frame 14. The slider 110 may be formed on the slider support frame 14 to be inclined in the same direction as the coin discharge guide 13.

In addition, a forward-rearward movement drive part 120 for moving the slider 110 forward or rearward is installed in the slider support frame 14, a guide long hole 121 is formed to correspond to a lower surface of the slider 110 in the forward-rearward movement drive part 120 in a longitudinal direction of the slider 110, pin support protrusions 122 are formed on the lower surface of the slider 110 in a direction toward the guide long hole 121 to be spaced apart from each other by a predetermined distance, and a pin support portion 123 is formed between the pin support protrusions 122. In addition, a rotation link 124 is formed in the slider support frame 14 to be supported by a hinge shaft 125 and rotated in a direction in which the guide long hole 121 is formed. A long hole 124*a* is formed in the rotation link 124 in a longitudinal direction thereof, and a pin 126 to be inserted into the pin support portion 123 is formed on an end portion of the rotation link 124. A motor 127 is formed to correspond to the guide long hole 124*a* on the slider support frame 14. An eccentric cam 129 for rotating the rotation link 124 to move the slider 110 forward or rearward is formed on a drive shaft of the motor 127, and a rotation pin 128 to be inserted into the long hole 124*a* of the rotation link 124 is installed on the eccentric cam 129. The rotation pin 128 is formed at a position, which is spaced apart from a rotation center of the eccentric cam 129 by a predetermined distance, on the eccentric cam 129. Meanwhile, the coin counting apparatus 10 includes a first detection sensor part 230 for counting coins which are input to the coin soring unit 100 and sorted, a second detection sensor part 240 for detecting an operation state of the slider 110 selected to discharge the coins so as to give change, and an image display device, which is not illustrated in the drawings, for displaying the counted coins and a control part configured to count change on the basis of the signals of the first detection sensor part 230, wherein the coins are counted using signals detected by the first detection sensor part 230.

The first detection sensor part 230 is installed on the guide rib 29*b*, the frame 12, or the slider support frame 14 positioned above the coin collection container 201 and detects falling coins. The first detection sensor part 230 may be provided as a proximity sensor or photo-detection sensor.

In addition, in the second detection sensor part 240, a detection dog 241 extending from an end portion, at which the hinge shaft 125 is installed, of the rotation link 124, and a support bracket 242 installed on the slider support frame 14 at both sides of the detection dog 241 to form an inlet space of the detection dog 241 are installed to detect whether the detection dog 241 enters or exits the inlet space so as to count the coins discharged by the slider 110. The second detection sensor part 243 may be provided as a photo-detection sensor or proximity sensor as described above.

The operation of the coin counting apparatus formed as described above according to the present invention will be described below.

First, in order to count the coins 300 using the coin counting apparatus 10, the rotation disc drive motor 55 of the coin supply unit 50 is driven to rotate the rotation disc 51, and the drive motor 74 is driven to rotate the ring gear 72. In this state, coins of which sizes are different according to their values, that is, the coins 300 to be counted, are input through the coin inlet 56 of the coin input hopper member 57 at random.

Then, the input coins 300 are positioned on the upper surface of the rotation disc 51, and the coins 300 are moved in the radial direction due to a centrifugal force due to rotation of the rotation disc 51, guided to the discharge guide portion 27*a* of the guide member 27, and discharged to the coin guide portion 26 of the coin separation plate 28.

The coins 300 discharged to the coin guide portion 26 are moved along the coin guide portion 26 in a state in which the coins 300 are pressed by the pressing piece 77*b* of the elastic pressing member 77 installed on the lower surface of the rotating ring gear 72 of the coin transfer unit 70.

Figure 7:
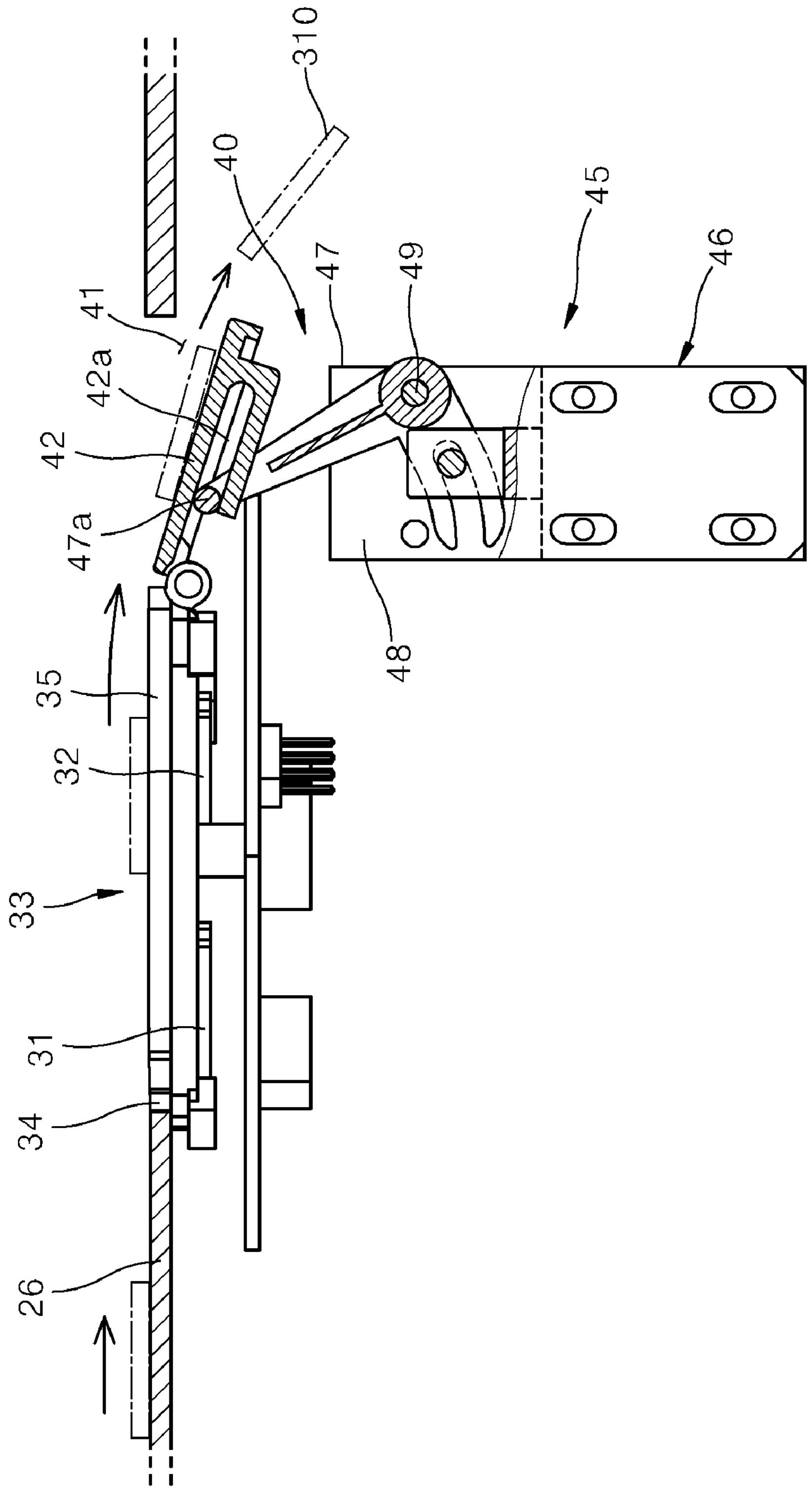

During this process, the coins 300 are moved along the coin guide portion 26 of a region in which the bad coin discharge unit 30 is installed. The states of the coins 300 being moved are detected by the first and second bad coin sensor 31 and 32 disposed on the lower surface of the coin guide plate member 35 of the bad coin discharge unit 30. When the coin 300 being moved is recognized as a bad coin, the solenoid 46 of the discharge portion 40 is operated to rotate the discharge door 42 downward. Accordingly, as illustrated in FIG. 7, the discharge door 42 is opened to discharge the bad coin from the coin guide portion 26.

Whether the coin moving along the coin guide portion 26 is a normal coin or a bad coin is determined using a principle in which a normal coin and a bad coin may be determined using a phenomena in which, when the normal coin (having a resistance value within a specific range) comes into contact with and passes both of the first bad coin detection sensor 31 and the second bad coin detection sensor 32, a predetermined frequency waveform corresponding to a resistance value within a specific range is generated in a detection part, and when a bad coin (having a resistance value outside the specific range) comes into contact with and passes both of the first bad coin detection sensor 31 and the second bad coin detection sensor 32, a waveform which is clearly different from the predetermined frequency waveform is generated in the detection part.

When the bad coin is completely discharged as described above, the solenoid 46 operates to rotate the link 47 so as to close the discharge door 42 so that the discharge door 42 becomes the coin guide portion 26.

In addition, when the coin moving along the coin guide portion 26 passes through the bad coin detection part 33 and is recognized as a normal coin, the coin moves along the coin guide portion 26 toward the coin separation unit 20. In addition, when the coin 300 is moved on an upper surface of the coin sorting hole 21 of which a size is equal to a size of the moved coin 300, the coin 300 falls due to a weight and a pressing force of the pressing piece 77*b*, is guided by the guide rib 29*b* of the guide member 29, and is supplied to the coin collection container 101.

According to the above-described method, the coins 300 input to the input hopper member 43 are stacked in the coin collection containers 101 according to the kinds thereof. In this case, the coins 300 input to the coin collection containers 101 are detected by first detection sensor part 230, counted by the control part, and displayed on the display.

When the coins are stacked in the coin collection containers 101 so that the coins fill the coin collection containers 101, a coin supplied after the coins is discharged through the coin discharge portion 101*a* formed in the coin collection container 101, and the discharged coin is guided by the coin discharge guide 13 and falls in an external container (not shown).

Figure 9:
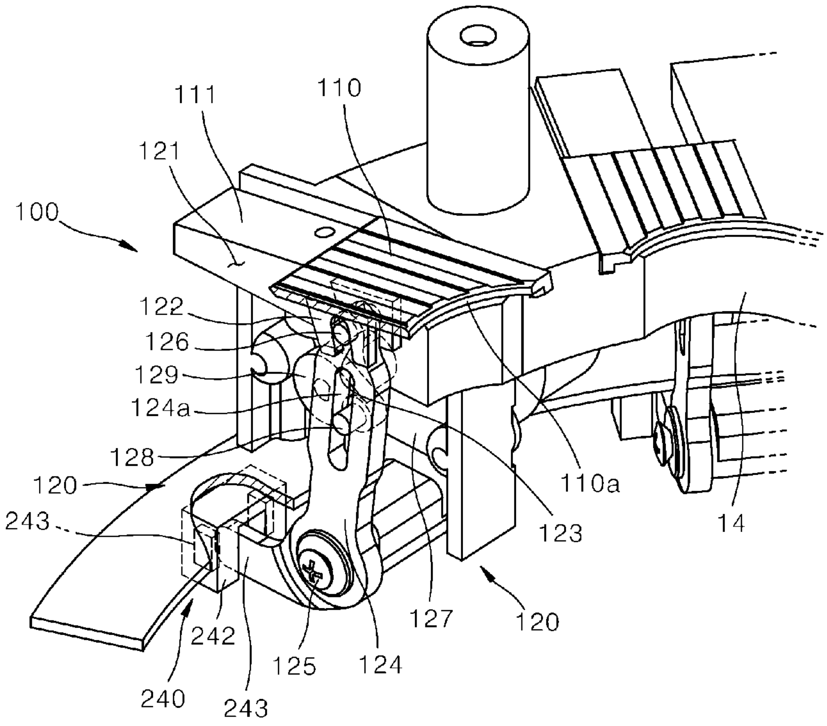
FIG. 9 is a perspective view illustrating a front-rear movement drive part of the coin stack and change discharge unit illustrated in FIG. 8.

In addition, as illustrated in FIGS. 8 and 9, in order to give change after the coins are completely counted, the control part drives the motor 127 installed under the coin collection container 101 from which the coin is discharged. Then, the rotation pin 128 of the eccentric cam 129 installed on the drive shaft of the motor 127 moves in the long hole 124*a* of the rotation link 124 to rotate the rotation link 124 so that the slider 110 is moved rearward.

Accordingly, the stacked coins 300 are moved downward and inserted into a coin support groove 110*a* formed in a front surface of the slider 110. In addition, when the eccentric cam 129 rotates further, the rotation link 124 is rotated to move the slider 110 forward so as to push the coin supported by the coin support groove 110*a* of the slider 110 to a suit 400. In this case, the second detection sensor part 243 and the control part count one discharged coin. The coins are counted by the second detection sensor part 243 installed in the support bracket 242 when the detection dog 241 installed on the rotation link 124 enters or exits a space portion formed in the support bracket 242.

The motor installed under the coin collection container selected through the above-described operation may be driven to discharge coins so as to give change.

As described above, since the coin counting apparatus according to the present invention can count coins input at random and sort bad coins, trouble due to the bad coins can be reduced. In addition, since the coin counting apparatus separates coins and gives change, a commodity value of the coin counting apparatus can be improved. Particularly, since the coins are separated while the pressed coins move to coin separation holes formed in the coin separation plate, reliability of coin separation can be improved.

The present invention has been described with reference to the embodiments illustrated in the drawings, but these are only examples. It will be understood by those skilled in the art that various modifications and equivalent other example embodiments may be made. Therefore, the scope of the present invention is defined by the appended claims.

The invention claimed is:

1. A coin counting apparatus allowing a bad coin to be sorted, comprising:

a coin separation unit installed on a support frame and including a coin sorting part in which a plurality of coin sorting holes for sorting coins according to sizes of the coins are formed in a circumferential direction and a coin separation plate on which a coin guide portion for guiding the coins to the coin sorting part is formed;

a bad coin discharge unit installed in the coin guide portion of the coin separation unit and configured to detect whether the coin moving to be sorted is a bad coin and sort the bad coin;

a coin supply unit configured to supply the sorting target coins to be sorted and moved along the coin guide portion;

a coin transfer unit elastically pressed against the coin separation unit and configured to move the coin input from the coin supply unit to the coin guide portion and the coin sorting holes in a state in which the coins are pressed against the coin separation plate;

coin collection containers installed on the support frame under the coin sorting holes of the coin separation plate to stack the coins passing through the coin sorting holes, the coin collection containers having cylindrical shapes;

a coin stack and change discharge unit installed between the frame and a slider support frame, the coin stack and change discharge unit being configured to count the coins stacked in the coin collection container and discharge change;

a slider, which is slid on a guide rail to open or close a lower surface of each of the coin collection containers and to discharge one coin when moving forward and rearward, the slider being formed on a lower surface of the support frame on which the coin collection containers are installed; and a forward-rearward movement drive part configured to move the slider forward and rearward installed on the slider support frame, the forward-rearward movement drive part including:

a guide long hole formed in a guide rail portion corresponding to a lower surface of the slider in a longitudinal direction of the slider;

pin support protrusions installed spaced apart from each other on the lower surface of the slider in a direction toward the guide long hole;

a pin support portion formed between the pin support protrusions;

a rotation link installed on the support frame corresponding to the pin support portion and supported by a hinge shaft to be rotatable in a direction in which the guide long hole is formed;

a long hole formed in the rotation link in a longitudinal direction thereof;

a pin inserted into the pin support portion is formed on an end portion of the rotation link;

a motor installed to correspond to the long hole on the support frame; and an eccentric cam on which a rotation pin to be inserted into the long hole of the rotation link is formed is installed on a drive shaft of the motor.

2. The coin counting apparatus of claim 1, wherein the bad coin discharge unit includes:

first and second bad coin detection sensors installed on the coin guide portion; and a discharge portion configured to discharge the bad coin detected by the first and second bad coin detection sensors from the coin guide portion before the bad coin is introduced into the coin sorting part.

3. The coin counting apparatus of claim 2, wherein the discharge portion includes:

a discharge door rotatably installed on a coin guide plate member, which is a part of the coin guide portion and on which the bad coin detection sensors are installed, to form a bad coin outlet in the coin guide portion; and a door open-close drive part installed on the coin guide plate member or a frame to open or close the discharge door, wherein the door open-close drive part includes a link operated by a solenoid, the link operated by the solenoid is rotatably installed on a support pin installed on a bracket for fixing the solenoid, a moving pin is installed on an end portion of the link and slidably supported by a long hole formed in a lower surface of the discharge door, and the other side of the link extends from the support pin at a predetermined angle and is connected to a shaft of the solenoid.

4. The coin counting apparatus of claim 1, wherein the coin supply unit includes:

a coin input hopper member connected to an inlet of the coin guide portion and forming a coin outlet;

a rotation disc installed in an interior defined by the coin input hopper member to discharge the coin input to the coin input hopper member toward the coin outlet; and a rotation disc drive motor supported by a lower surface of the coin separation plate to rotate the rotation disc.

5. The coin counting apparatus of claim 4, wherein:

the rotation disc is rotated by the rotation disc drive motor to discharge the coin through the coin outlet; and one or more elastic pieces which are each cut from an edge of the rotation disc toward a central portion of the rotation disc to have a predetermined width are integrally formed with the rotation disc.

6. The coin counting apparatus of claim 1, wherein the coin transfer unit includes:

a ring gear guided by an inner circumferential surface of the support frame to be rotatably installed on the coin separation plate installed on the support frame and including a hollow portion to expose a rotation disc of the coin supply unit;

a drive motor installed on the support frame;

a drive gear installed on a rotation shaft of the drive motor and engaged with the ring gear; and an elastic pressing member installed on the ring gear and configured to move the coin supplied from the coin supply unit in a state in which the coin is pressed against an upper surface of the coin separation plate.

* * * * *